(No Model.)

E. T. & E. E. STARR.
SECONDARY BATTERY.

No. 327,341. Patented Sept. 29, 1885.

WITNESSES:
Wm A. Skinkle
Alfred C. Newman

INVENTORS:
Eli T. Starr,
E. Eugene Starr,
By their Attorney,
Wm J. Peyton

UNITED STATES PATENT OFFICE.

ELI T. STARR AND E. EUGENE STARR, OF PHILADELPHIA, PENNSYLVANIA, ASSIGNORS, BY DIRECT AND MESNE ASSIGNMENTS, TO THE STARR ELECTRIC STORAGE COMPANY, OF CAMDEN, NEW JERSEY.

SECONDARY BATTERY.

SPECIFICATION forming part of Letters Patent No 327,341, dated September 29, 1885.

Application filed January 20, 1883. (No model.)

*To all whom it may concern:*

Be it known that we, ELI T. STARR and E. EUGENE STARR, both of Philadelphia, in the State of Pennsylvania, have jointly invented certain new and useful Improvements in Secondary Batteries, of which the following is a specification, this application being a division and continuation of our original application filed in the United States Patent Office December 31, 1881.

Our present improvements relate to the active material or compounds more especially useful in secondary or electric storage-batteries; and its objects, more particularly, are to bind the porous active material effectually together, increase the storage or accumulating power of the batteries, and facilitate the charging operation.

The subject-matter claimed herein is particularly pointed out at the close of the specification.

Figure 1:
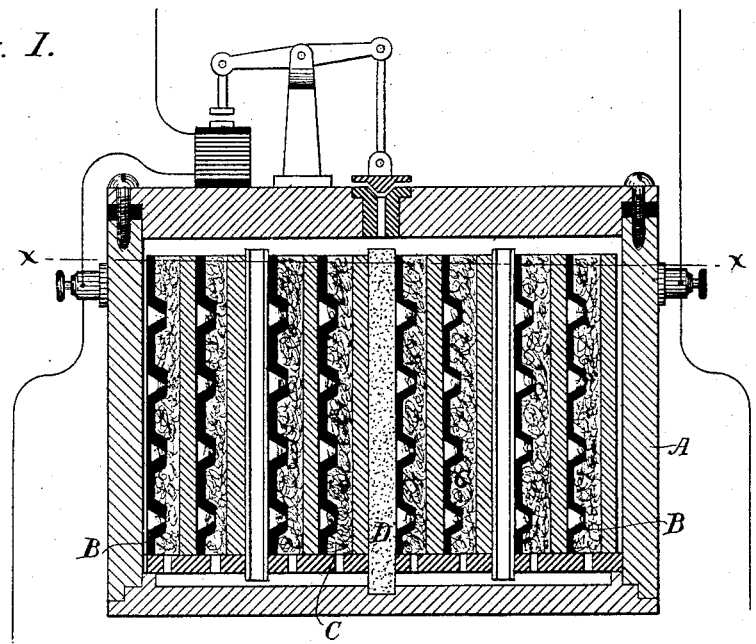
Figure 2:
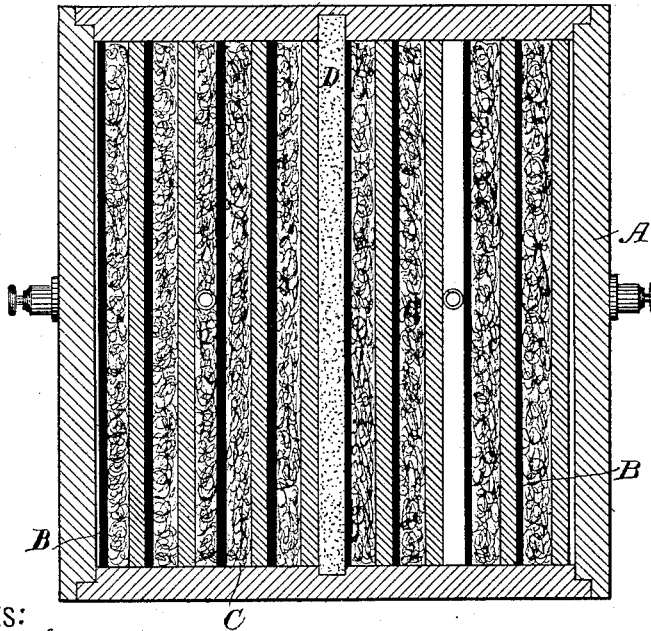

The accompanying drawings represent a vertical section in Figure 1, and a horizontal section in Fig. 2, through a battery embodying our present improvements.

This present application, as above stated, is a division of our application filed December 31, 1881, and is restricted to the subject-matter particularly recited in the claims at the close of this specification. We disclaim herein all other parts of our invention described or substantially indicated in this case in favor of our said application of 1881.

In order to carry our present improvements into effect, we take finely-divided active material, or material to be made active—such as finely-divided lead, red oxide of lead, peroxide of lead, sulphate of lead, peroxide of manganese, or any equivalent of these materials—and thoroughly mix it with dilute sulphuric acid (or with an equivalent salt in solution) to the consistency of a paste, or to a plastic mass. This paste so prepared is then preferably thoroughly mixed or incorporated with a binding material, preferably fiber or filaments—such as raw cotton, for example. The fibers, by reason of their mixture with the oxide (or its equivalent) and the acid, or its equivalent liquid, become virtually conductors throughout the plastic mass, whereby it will be evident that a largely-increased surface of the active material is presented to the action of the charging-current, and greater surface is afforded for the accumulation of the energy of the charging-current. Not only does the fiber act in the highly beneficial manner indicated, but it enables a secondary-battery element of large capacity to be constructed without too great weight, and, what is very important, it constitutes a binding agent to bind the active mass together.

The proportion of the binding agent may be greatly varied, but should never reach the quantity to interfere with the accumulating action of the element. The fiber may be used to good advantage in about the same proportion, relatively, to the oxide and acid as the fiber or filaments is used, relatively, to the other materials by house-plasterers in preparing the ordinary plaster for ceilings and walls.

The improved active material may be used as a coating for the plates or supports of the battery elements, and in that case it is preferably mechanically applied to the support or supports in its plastic or pasty condition, and the active coating or layer will be held more securely in place and with less liability of detachment than if no binding agent is employed in the mixture. The dilute acid, when employed as the liquid of the mixture, adds to the conductivity of the element, and, if used as a coating or layer, to the coating, and it also destroys grease and dirt. The acid also has some chemical action on the mixture, it is believed, and makes it set or harden thoroughly. When the paste is applied to a support as an active layer or body, it cleanses said support and causes the paste to stick or adhere more closely thereto, and also enables better action to take place in charging and discharging the element. The active material and a binding agent mixed to a paste with dilute sulphuric acid also possesses other advantages; but we deem it unnecessary to recite them here.

Our invention claimed herein is of course not limited to sulphuric acid as the liquid ingredient of the pasty or plastic mixture for use in electric batteries, although it is preferred.

We do not claim in this application the pasty or plastic mixture or compound of sulphuric acid or an equivalent liquid, and active material; nor a pasty or plastic mixture of finely-divided lead or lead compound with sulphuric acid or an equivalent liquid; nor the combination of such a mixture with a battery support or plate, as that forms the subject-matter of another application filed by us January 8, 1883, No. 81,268, as a division of our aforesaid original application of December 31, 1881, the matter claimed in our said application, No. 81,268, not, however, being directed to a binding agent or material as part of the active mass or mixture.

In the drawings, A represents the battery vessel or box; B, the plates or supports of the electrodes; C, the active material applied to said supports, and D a porous partition between the electrodes. The details of the construction and operation of the particular form of battery shown in the drawings are fully described in our original application, and in Patent No. 268,308, of November 28, 1882, and in other divisions of our said original application, and need not be elaborated here.

This division of our application of 1881 is numbered "5" for identification.

We claim herein as of our invention—

1. An active compound for use in electric batteries, consisting of active matter, and a binding agent therefor, mixed to a pasty or plastic condition with a conducting-liquid, substantially as described.

2. The combination, with a battery-electrode, plate, or support, of an active compound consisting of active matter, and a binding agent therefor, mixed to a pasty or plastic condition with a conducting-liquid—such as sulphuric acid—substantially as described.

3. An active compound for use in the manufacture of secondary batteries, consisting of finely-divided lead or lead compound, and a binding agent, mixed to a pasty or plastic condition with a suitable liquid, substantially as described.

In testimony whereof we have hereunto subscribed our names this 9th day of November, A. D. 1882.

ELI T. STARR.
    E. EUGENE STARR.

Witnesses:
 WM. J. PEYTON,
 EUGENE V. BROWN.